United States Patent [19]

Lane

[11] Patent Number: 5,181,774
[45] Date of Patent: Jan. 26, 1993

[54] LAMP BRACKET

[76] Inventor: Lee Lane, 336 - 204 Westhill Place, Port Moody, B.C. V3H 1V2, Canada

[21] Appl. No.: 818,205

[22] Filed: Jan. 8, 1992

[51] Int. Cl.$^5$ .......................... F21V 21/00; F21L 7/00
[52] U.S. Cl. ...................................... 362/72; 362/191; 362/396; 224/30 A
[58] Field of Search ................ 362/72, 191, 202, 396, 362/226; 224/30 R, 30 A, 42.45

[56] References Cited

U.S. PATENT DOCUMENTS

| | | | |
|---|---|---|---|
| 1,222,458 | 4/1917 | Peterson | 362/72 X |
| 4,061,258 | 12/1977 | Dysart | 224/42.45 X |
| 4,390,927 | 6/1983 | Von Feldt | 362/396 X |
| 4,541,555 | 9/1985 | Miree | 224/41 |
| 4,596,370 | 6/1986 | Adkins | 224/30 A |
| 4,618,081 | 10/1986 | Miree | 224/41 |
| 4,688,705 | 8/1987 | Miree | 224/39 |
| 4,697,725 | 10/1987 | Miree | 224/41 |

Primary Examiner—Allen M. Ostrager

[57] ABSTRACT

A holder to allow temporary attachment of a lamp to a body. The holder has a base which can be attached to the body. The lamp holder is removably attached to the base by the provision of a releasable joint. The invention permits the easy removal of a flashlight from, for example, a bicycle to prevent theft of the lamp from the bicycle when the bike is left unattended. The invention also permits the use of a simple, easily available, flashlight as a bicycle lamp.

14 Claims, 3 Drawing Sheets

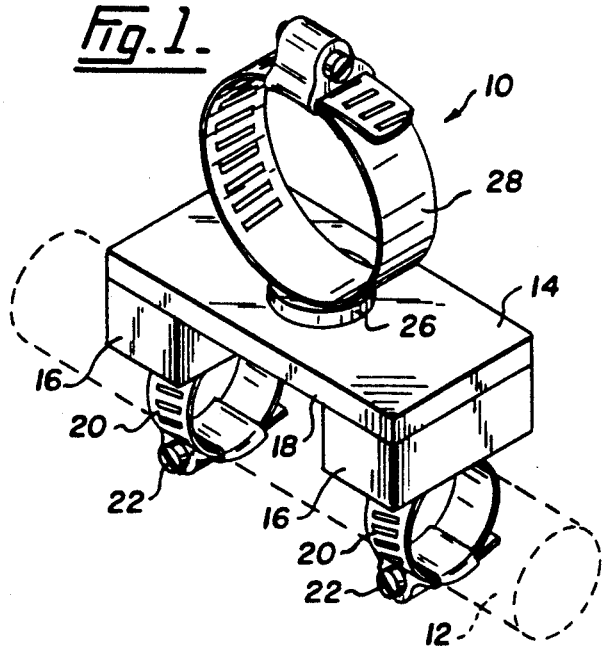
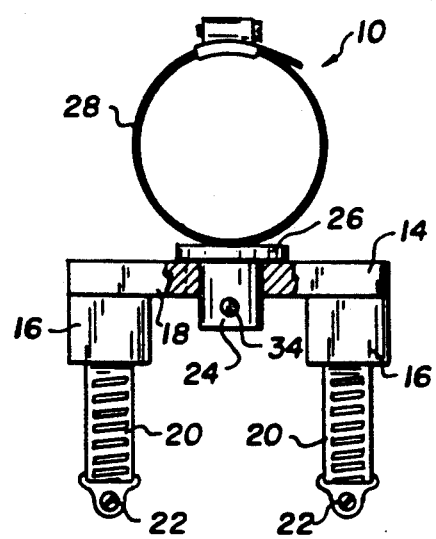
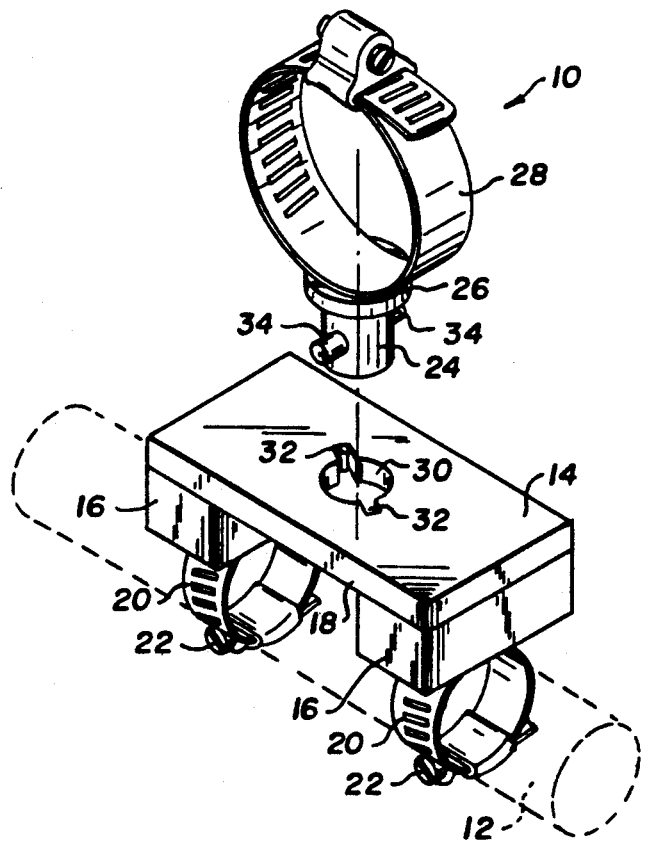

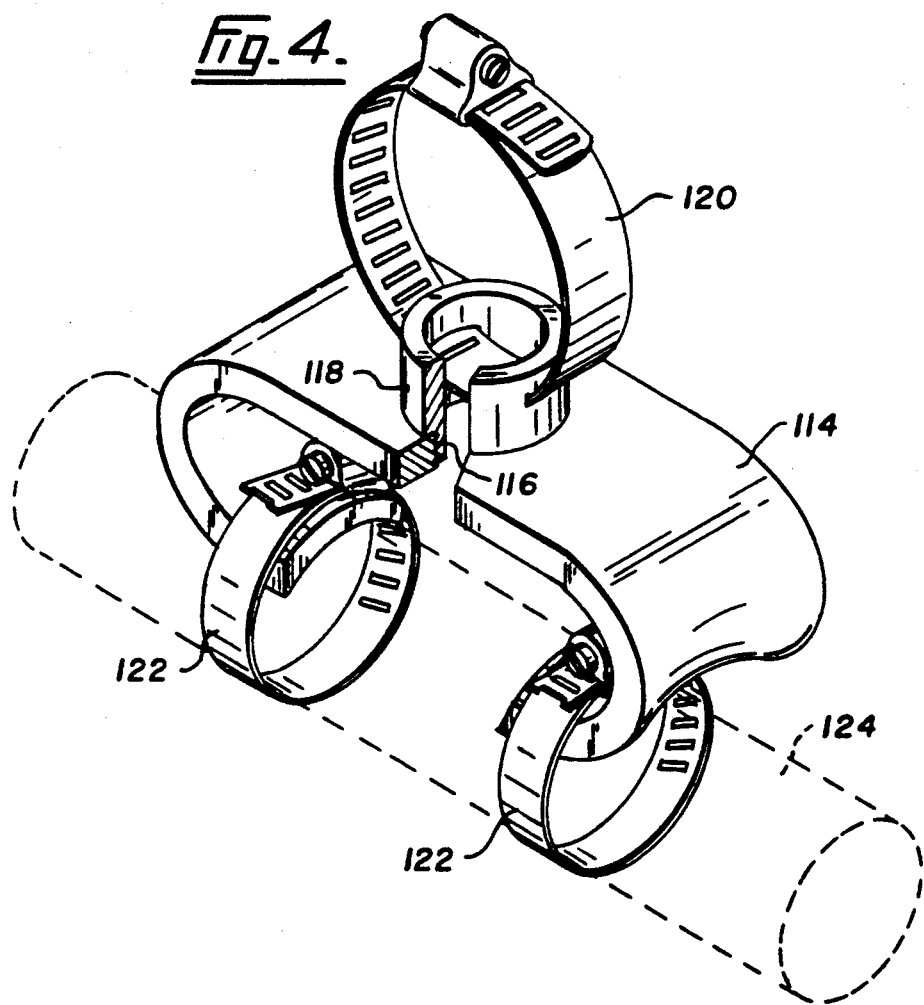

LAMP BRACKET

FIELD OF THE INVENTION

This invention relates to a holder to allow a temporary attachment of a lamp to a body. The invention is of particular application in allowing the holding of a simple cylindrical flashlight to a bicycle.

DESCRIPTION OF THE PRIOR ART

In recent years cycling has become extremely popular in North America. It has long been popular in Europe and in Asia. In Europe most countries require the use of lamps on a bike when it is used at night but the use of lamps on bicycles is not popular in North America. As a result a cyclist at night is a considerable hazard. There appears to be reaction in North America against the use of lamps that generate power from a dynamo. Such lamps are popular in Europe. The dynamo is driven by contact with the wheels of the bicycle to generate the necessary electrical energy to light a lamp bulb.

There are various types of lamps that attach to the handle bars of a bicycle in North America, usually by a simple clip. Unfortunately, these lamps are very easily stolen.

SUMMARY OF THE INVENTION

The present invention addresses the need of providing a simple bicycle lamp that cannot easily be stolen and also allows a simple flashlight, easily available, to be used as a bicycle lamp.

The present invention provides a holder to allow temporary attachment of a lamp to a body, the holder comprising:

a base having an underside;

means to attach the base to the body;

a lamp holder to be removably attached to the base; and releasable joint to attach the lamp holder to the base.

BRIEF DESCRIPTION OF THE DRAWINGS

Aspects of the invention are illustrated, merely by way of example, in the accompanying drawings in which:

FIG. 1 is a perspective view of a holder according to the present invention;

FIG. 2 is a front elevational view of FIG. 1;

FIG. 3 is a further view of the holder according to the present invention showing more clearly the component parts of the holder;

FIG. 4 is a perspective view of a further embodiment of the present invention.

DESCRIPTION OF THE PREFERRED EMBODIMENTS

Figure 5:
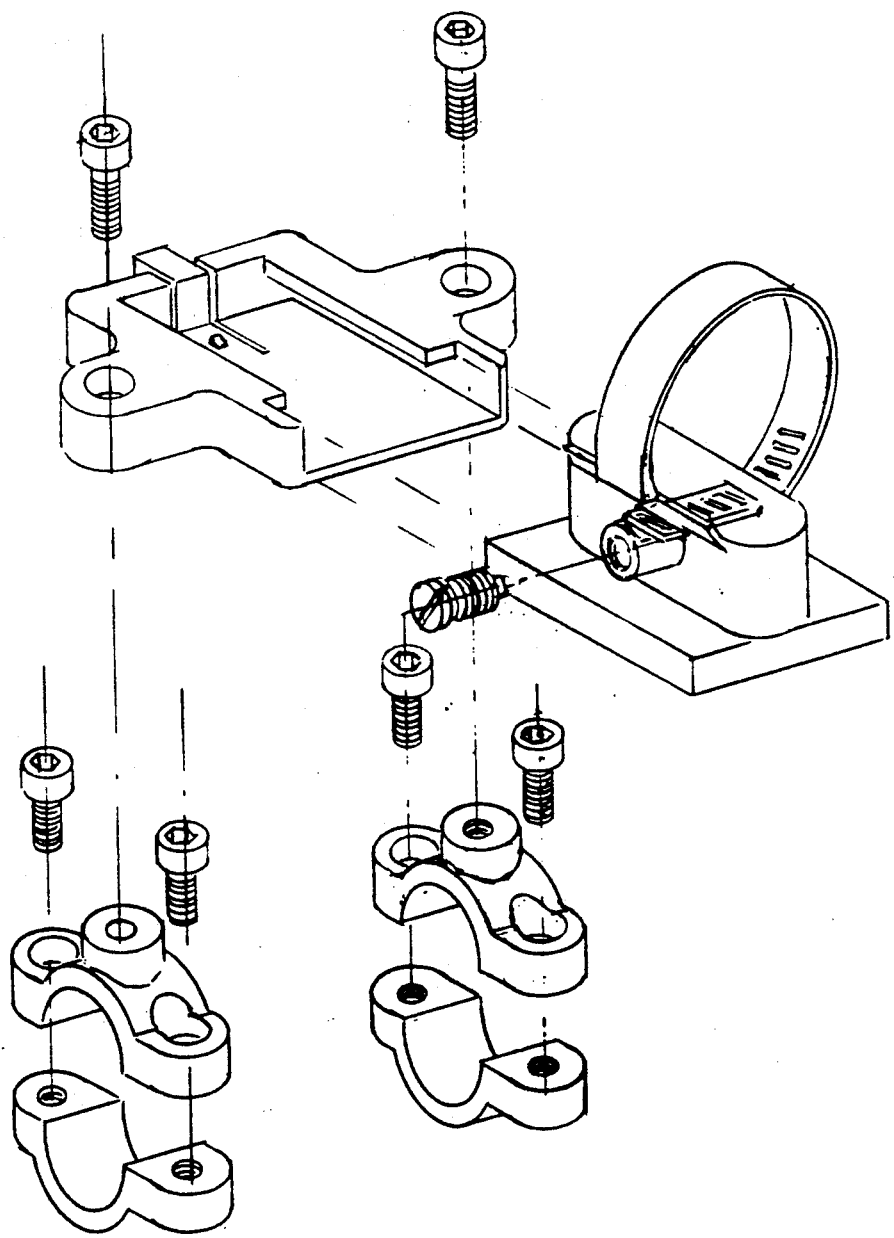
FIG. 5 is a perspective view of a yet further embodiment of the present invention.

FIGS. 1 to 3 show a holder to allow temporary attachment of a lamp (not shown) to a body. In the drawings the body is a cylinder 12. The invention can find application in any application where simple, temporary mounting of a lamp is required but it finds particular application in bicycles and cylinder 12 is, for example, part of the handle bars. The holder comprises a base 14. In FIGS. 1 to 3 the base 14 comprises a flat platform having projections 16 on its underside 18 to define a recess on the underside of the base. This recess allows fitting of the holder 10 over a projection, for example the projection that may result where the handle bars of a bicycle are attached to the frame.

There are means to attach the base 14 to the bicycle. In the illustrated embodiment these means comprise screw clips 20 that can be secured to the cylinder by rotation of screws 22. Clips 20 are well known.

There is a lamp holder to be removably attached to the base. In FIGS. 1 to 3 the lamp holder comprises a cylinder 24 having an upper flange 26. There are attachment means on the top of the cylinder 24, for example spot welded to the flange 26, to engage the lamp. Typically, the lamp will be a cylindrical flashlight. In FIGS. 1 to 3 the attachment means comprises a screw clip 28 which can be easily and strongly attached to a flashlight.

There is a releasable joint to attach the cylinder 24 to the base 14. The joint comprises an opening 30 in the base 14 extending through the base 14 to the underside 18 of the base. There are opposed radial extensions 32 in the opening 30. The cylinder 24 is formed with radial projections 34 to pass through the radial extensions 32 in the opening 30. The flange 26 contacts the upper surface of the base 14 and twisting of the cylinder 26, typically by twisting the flashlight body attached by clip 28, rotates the projections 34 so they do not align with the openings 32. The distance between the upper surface of the projections 34 and the lower surface of the flange 26 is such that the cylinder 24 is firmly held in the base 14. If necessary the flange 26 or the underside of the base 14 can be inclined to provide a camming action, that is to increase the strength of the grip of the cylinder 24 in base 14.

To use the holder of FIGS. 1 to 3 the base 14 is attached to the cylindrical body 12 by either sliding the clips 20 along the body 12 or by releasing the clips 20, folding them around the body 12 and then tightening the screws 22. These clips are, of course, well known, as is their manner of use.

Once the base 14 is in position it may be left permanently on the body 12.

The lamp holder is attached to the lamp by positioning a cylindrical flashlight in the clip 28 and by tightening the screw of the clip.

When it is desired to attach the lamp to the bike the cylinder 24 is positioned above the base 14 with the projections 34 aligned with the extensions 32. The cylinder 24 is pushed downwardly and twisted to secure to the base. The lamp may then be switched on by the conventional switch, usually present on the body of the lamp. When it is desired to remove the flashlight the cylinder 24 is simply twisted until the projections 34 align with the extensions 32 and the lamp is then lifted upwardly. It may be stored in a pocket or pack and cannot, of course, be stolen from the bike.

The cylinder and base may be moulded from plastic. They may also be made of lightweight metal. The projections 16 may be made, for example, of rubber to provide a shock absorbing effect for the base 14, and thus for the lamp.

FIG. 4 shows a further embodiment of the invention. In FIG. 4 the holder has a base 114 of a generally C-shaped configuration. There is a threaded opening 116 at its center to receive a threaded collar 118. A clip 120 extends through the collar 118. There are clips 122 to engage a cylindrical body 124, again typically the handle bar of a bike.

As in the previous embodiment the clip 120 holds a cylindrical lamp. The lamp can be removed from the clip 120. Similarly release of the clips 122 releases the base 114. Furthermore, in this embodiment because of the C-shape of the base 114 the clips 122 may be left in position when the base 114 is removed from cylinder 124. It is not necessary to undo the clips 122 completely to remove the base 122 from the body 124, should removal be necessary.

Again, the lamp is temporarily but firmly attached. It is located simply by threading or unthreading the cylinder 118 into the body.

The embodiment of FIG. 4 is desirably moulded from plastic. Again lightweight metal is also appropriate.

FIG. 5 shows a further embodiment of the invention. In FIG. 5 the base 214 includes a recess 216 defined by a front wall 218, side walls 220, a floor 222 for the base and upper walls 224 positioned at the top of each side wall 220. A lamp holder 226 is a slide fit in the recess 216. The lamp holder is a simple platform 228, dimensioned to fit in the recess 216 and having a central projection 230 to which a clip 232 is attached. In a particularly desirable embodiment the clip 232 is formed integrally with the central projection 230 but is the same general construction shown in previous embodiments. Clip 232 is tightened by tightening screw 233.

There is an inset 234 in the front wall 218 and the floor 222 formed by openings 236. The inset 234 can be moved downwardly but resiles to an upper position, the upper position being shown in FIG. 5. There is a projection 238 on the inset 234 to engage the underside of the platform 228.

The base 214 has lugs 240 extending laterally. Screws 242 extend through openings in the lugs 240 to engage threaded openings 244 in brackets 246. Screws 248 extend through openings in the brackets 246 and engage lower bracket 250. The brackets 246 and 250 are each generally C-shaped so that tightening of the screws 248 tightens the brackets around a cylindrical body, for example handle bars.

In the embodiment of FIG. 5 the lamp is secured by clip 232, tightened by tightening screw 233. The lamp, with the lamp holder 226, is then slid into the recess 216 in the base 214. The inset 234 moves down automatically but resiles upwardly either to engage the hollow base of the platform 228 or to engage a small recess (not shown) formed in the platform. The lamp holder is then securely located in the recess 216.

To remove the base, the owner simply presses down on the inset 234 and slides the lamp holder from recess 216.

The present invention thus provides a simple and effective means of temporarily attaching a lamp to a bicycle.

I claim:

1. A holder to allow temporary attachment of a lamp to a bicycle, the holder comprising:
   a base having an underside;
   means to attach the base to the bicycle;
   a lamp holder to be removably attached to the base; and
   a releasable joint to attach the lamp holder to the base.

2. A holder as claimed in claim 1 in which the lamp is a cylindrical flashlight.

3. A holder as claimed in claim 1 in which the base has a recess to allow fitting of the base over a projection.

4. A holder as claimed in claim 1 in which the means to attach the base to the bicycle comprises at least one screw clip to fit about a tubular part of the bicycle.

5. A holder as claimed in claim 4 in which the tubular part comprises a handle bar.

6. A holder as claimed in claim 1 in which the lamp holder comprises a cylindrical body;
   attachment means on the cylindrical body to engage the lamp.

7. A holder as claimed in claim 6 in which the releasable joint comprises an opening in the base extending through the base to the underside of the base;
   opposed radial extensions in the opening;
   radial projections on the cylindrical body to pass through the radial extensions in the opening and to contact the underside of the base on twisting of the cylindrical body.

8. A holder as claimed in claim 6 in which the cylinder is formed with a screw clip to releasably attach to a flashlight.

9. A holder as claimed in claim 1 in which the base is of generally C-shaped configuration.

10. A holder as claimed in claim 9 in which the releasable joint to attach the lamp holder to the base is a thread formed in the base;
    a cylindrical body formed with a corresponding thread;
    attachment means on the cylindrical body to engage the lamp.

11. A holder as claimed in claim 10 in which the base has an internally threaded opening and the cylinder is externally threaded.

12. A lamp holder as claimed in claim 1 in which the base includes a recess defined by a front wall, side walls, a floor for the base and upper walls remote from the underside; the lamp holder being a slide fit in the recess.

13. A lamp holder as claimed in claim 1 in which there is an inset in the front wall and part of the floor which can be moved downwardly but resiles to an upper position;
    means on the inset to engage the lamp holder.

14. A holder as claimed in claim 13 in which the means on the inset to engage the lamp holder comprises a projection to engage the lamp holder.

* * * * *